United States Patent Office 3,709,972
Patented Jan. 9, 1973

3,709,972
METHOD FOR MANUFACTURING A PERFORATED TUBE
Willem Gerholt, Hardenberg, Netherlands, assignor to Industriele Onderneming Wavin N.V., Zwolle, Netherlands
Continuation-in-part of application Ser. No. 756,047, Aug. 28, 1968. This application June 5, 1970, Ser. No. 43,807
Claims priority, application Netherlands, Sept. 1, 1967, 6712016
Int. Cl. B29c 25/00
U.S. Cl. 264—236
6 Claims

ABSTRACT OF THE DISCLOSURE

A perforated filter tube manufactured by wrapping tape shaped thermoplastic or textile material on a deformable core, outwardly protruding metal projections being anchored in the material, and reinforcing glass fibers and a polyester or epoxy resin being applied on the layer formed by the windings on the core, without covering the end of the projections with resin or fibers. After pre-polymerization at a temperature of, for example 70° C., the deformable core is removed and the tape-shaped material together with the projections is removed by pulling the same from the inner side of the thusly formed tube.

---

This is a continuation in-part of my application Ser. No. 756,047, filed Aug. 28, 1968, now abandoned.

The invention relates to a method for manufacturing a perforated, reinforced thermosetting resin tube, such as a filter tube.

Perforated tubes, such as filter tubes made of special steel alloys, are to a large extent used in the production of mineral oil. Owing to exposure to corrosive solutions, such as ground water containing salt compounds or other corrosive substances, these tubes are very rapidly corroded, whereby after a relatively short period said tubes have to be replaced. On the one hand, this replacement gives rise to an increase of the working expenses, while on the other hand the replacement of the tubes causes losses in production of mineral oil.

In order to obviate these disadvantages it has been suggested to provide these tubes, before they are put into use, with a layer of a thermosetting synthetic resin, such as an epoxy or polyester resin. Due to the lining of the steel alloys with such synthetic resin layers, a considerable prolongation of the life of the filter tube is obtained. However, in view of the difficulty in obtaining adherence between the steel pipe and the resin the life is not quite satisfactory. Moreover the production costs remain high since it is necessary to provide slits in steel tubes.

It has been suggested to start from fiber reinforced polyester or epoxy resin tubes. This has the drawback that the provision of perforations implies that the fibers in the tubes are cut through. This in turn considerably reduces the strength of the tube since the cut fibers constitute entrances for the penetration of corrosive liquids from the ground into the resin material, which causes disintegration of the tubes so that they become useless. It is required to provide the desired perforations after such tubes have been manufactured on a core, since the application of a core provided with projections corresponding with the desired perforations would require special measures as to the construction of the core.

In order to overcome these difficulties it has been suggested to provide reinforcing fibers and thermosetting synthetic resin on or in a mold fitted with projections corresponding with the perforations in the tube, while no reinforcing fibers, or synthetic resin, are provided on the projections, whereupon after a suitable pre-polymerization the projections are moved without affecting the tube formed from the resin and reinforcing fibers, as by melting or dissolving said projections with the aid of a solvent which is inert with respect to the resin.

Such a method exhibits the advantage that a perforated tube can be obtained with a great strength which is resistant to corrosive liquids, since the resin layer can be exclusively affected from the exterior. Since no cut-through fibers occur in these tubes, there are consequently no entries for the corrosive ground water medium as is often found in the mineral oil production industry.

In practice, a mandril will often be used as a mold which is constructed in such a way that not only can the projections be removed, such as by melting or by dissolving with a resin in the solvent, but it is also provided with an outer layer. As a result the removal of the tube after the same has been manufactured can be more simply effected. It should be noted that methods based on centrifugal action can also be employed.

As the material for this outer layer with projections, certain commonly known metal alloys can be used in practice which melt at temperatures ranging from 80° C. to 100° C. For a person skilled in the art it will, however, be obvious that any metal alloy melting at temperatures under 170° C. can be used. After the removal of the projections together with the outer layer, if any, of the mandril, the tube can be hardened by heating for a few hours at temperatures of 170° C.

This method presents the drawback that each time the core must be provided with the desired projections since the projections are lost by melting or dissolving of the same after manufacturing each tube.

An object of the invention is to provide for removing these difficulties as is attained by the following method of the invention.

A method for manufacturing perforated fiber reinforced thermosetting resin perforated tube comprises the following steps:

(a) covering the inner or outer side of a deformable core with a tape- or tubular shaped flexible material provided with rigid projections, anchored in the tape-shaped material, and forming a cylindrical surface on or in this core with the rigid projections being anchored in the tape-shaped material;

(b) providing reinforcing fibers and synthetic thermosetting resin on the outer side of the cylindrical surface, such reinforcing fibers and synthetic thermosetting resin not being provided on the free ends of the projections;

(c) removing the core after at least partial polymerization of the thermosetting resin;

(d) removing the tape or tubular shaped material by pulling the same from the tube and curing the resin.

Such a method is advantageous in that in a very simple way filter tubes can be manufactured, which do not contain severed fibers so that no entries for corroding ground water are formed, while the tape-shaped material with projections can always be employed again.

The invention will be clarified with reference to an embodiment as shown in the sole figure of the drawing which shows a longitudinal section of a core with a tube.

In the drawing is shown a deformable core 1 on which is wrapped a tape-shaped material 2. This tape-shaped material may consist of fabric or of a thermoplastic material such as polyvinylchloride. In the tightly woven fabric or thermoplastic tape 2 are anchored projections in the shape of thin steel pins 3 with heads lying in or against one of the tape surfaces. The projections may conveniently consist of wires which are twice bent at right angles, while the portion 4 of the wire situated between the two outward protruding ends of such a bent wire is accommodated in the fabric or plastic tape or is on the back side of the fabric so as to cooperate with the outer wall 5 of the core.

Onto the tape-shaped material 2 there is applied a separating layer 6 of wax in the case of a fabric tube. In the case of a plastic tube, such as polyvinylchloride, this may not be necessary. Thereupon glass fibers are wrapped on the surface formed by the windings of the tape 2, after which a thermosetting resin 7, such as, for example, polyester or epoxy, is applied. In the application of the resin and the glass fiber 8 the projections 3 are not covered as far as their free ends 3a by glass fibers and thermosetting resin.

On using polyester and after admixture of a suitable catalyst such as benzoyl peroxide, a preliminary polymerization is carried out for 20 minutes at a temperature of 70° C. Thereupon the core is removed and by pulling the tape-shaped material 2 said tape is removed from the resin layer 7 together with the projections embedded therein with or without curing for 1 hour at for example 120° C.

In this way, a perforated tube is obtained in which, at the location of the projections 3, apertures are formed. It is evident that the tape-shaped material with the projections can be used again. The deformable core consists for example, of two halves of a tube which can be laid one upon the other while interposing a rubber stop 9 with an outer diameter slightly greater than the inner diameter of the hollow core or tube formed by the two halves. After the formation of the perforated tube, the two halves can be removed in the way that the rubber stops are removed.

The pins 3 have a diameter of for example, 1 mm. or less and preferably 0.5 mm. or less.

It will be obvious that instead of wrapping the tape around the core it is also possible to provide the core with longitudinal strips of tape which are placed beside each other. It is also possible to apply said strips to the inner side of the hollow core. It is also recommended to coat the projections with compounds preventing adherence of the metal pins to the epoxy or polyester resin. Compounds of this type are waxes.

According to another embodiment, a tubular foil of thermoplastic material, such as polyethylene of 2 mm. thickness, provided with the projections is shrunk onto the core. After removal of the core, the tubular foil is pulled from the fiber reinforced thermosetting resin tube.

For an efficient removal of the core, the stops 9 prevent engagement of the longitudinal edges 10 of the two halves of tube forming the core 1.

What I claim is:
1. A method for manufacturing a perforated fiber-reinforced thermosetting resin tube comprising:
    (a) covering one surface of a deformable core with a flexible material in which are anchored at least substantially rigid projections to form a cylindrical surface on the core with the projections extending from the flexible material and having free ends,
    (b) applying reinforcing fibers and thermosetting resin on said cylindrical surface while keeping the fibers and thermosetting resin away from the free ends of the projections,
    (c) at least partially polymerizing the thermosetting resin to form a tube with said reinforcing fibers,
    (d) removing the core from said flexible material,
    (e) removing the flexible material from said tube by pulling the same from said tube to withdraw the projections from and leave perforations in said tube, and
    (f) curing the resin of said tube.
2. A method according to claim 1, wherein after applying the flexible material on the deformable core the surface of said flexible material which is to come into contact with the thermosetting resin is covered with a coating to prevent the thermosetting resin and reinforcing fibers from adhering to the flexible material.
3. A method according to claim 2, wherein the coating consists of a wax.
4. A method according to claim 1, wherein the projections are wires bent twice at right angles to form a length of wire situated between two outwardly protruding ends.
5. A method according to claim 1, wherein the flexible material is formed as a thermoplastic tubular foil which is shrunk onto the core.
6. A method according to claim 1 wherein the flexible material is a fabric.

References Cited
UNITED STATES PATENTS

| | | | |
|---|---|---|---|
| 1,481,807 | 1/1924 | Murray | 264—334 |
| 3,324,209 | 6/1967 | Holt et al. | 264—334 |
| 3,049,784 | 8/1962 | Cullen | 264—336 |

ROBERT F. WHITE, Primary Examiner

J. R. HALL, Assistant Examiner

U.S. Cl. X.R.

264—316, 318, 336